No. 734,918. PATENTED JULY 28, 1903.
W. L. MARTIN, DEC'D.
E. & W. MARTIN, EXECUTORS.
VEHICLE WHEEL AND BEARING THEREFOR.
APPLICATION FILED NOV. 20, 1902.
NO MODEL.
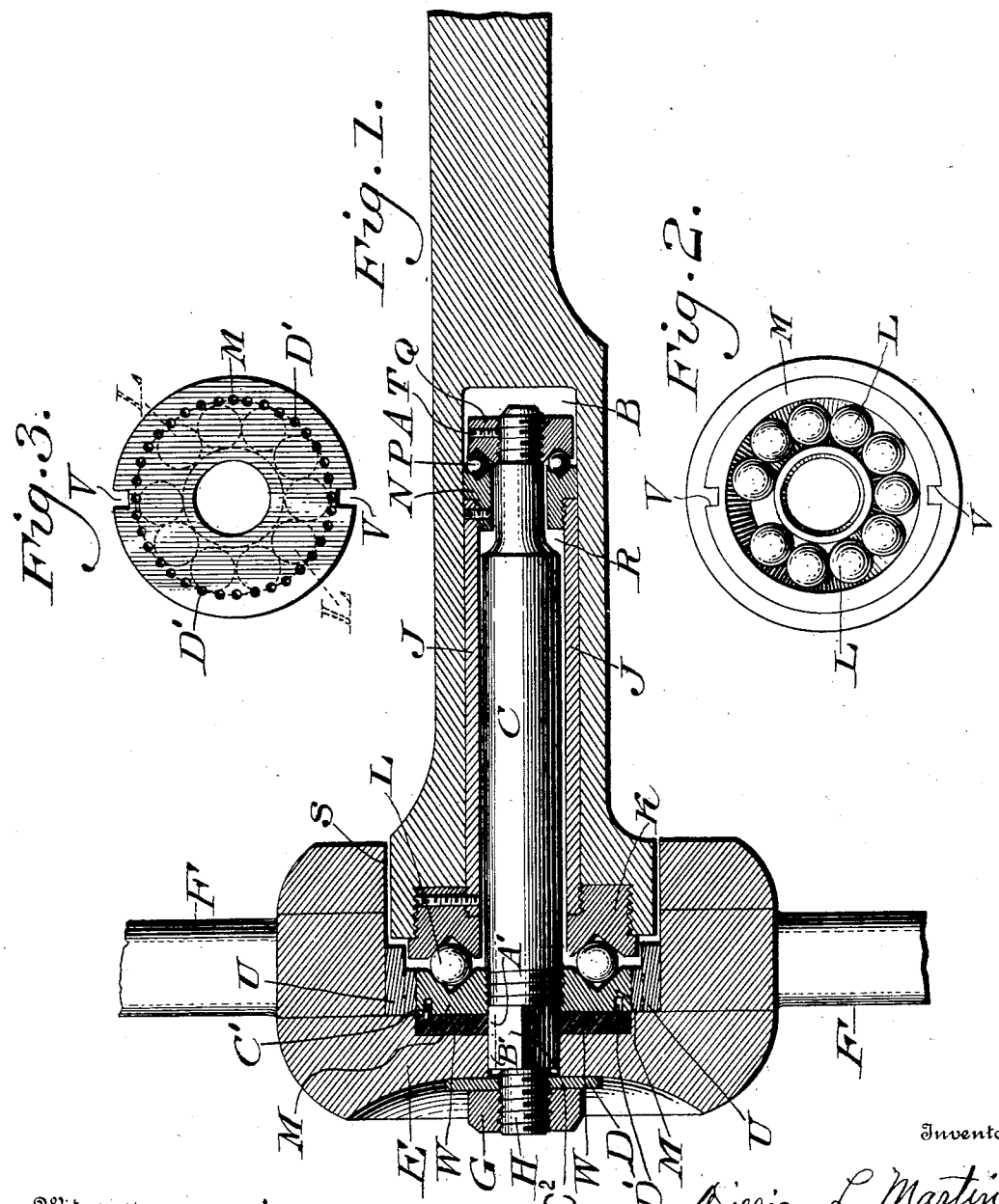

No. 734,918. Patented July 28, 1903.

UNITED STATES PATENT OFFICE.

WILLIAM L. MARTIN, OF RANCOCAS, NEW JERSEY; EMLEN MARTIN AND WILLIAM MARTIN EXECUTORS OF SAID WILLIAM L. MARTIN, DECEASED.

VEHICLE-WHEEL AND BEARING THEREFOR.

SPECIFICATION forming part of Letters Patent No. 734,918, dated July 28, 1903.

Application filed November 20, 1902. Serial No. 132,165. (No model.)

*To all whom it may concern:*

Be it known that I, WILLIAM L. MARTIN, a citizen of the United States, residing at Rancocas, in the county of Burlington, State of New Jersey, have invented a new and useful Improvement in Vehicle-Wheels and Bearings, of which the following is a specification.

My invention consists of an improvement in vehicle-wheels and bearings therefor, the novel features of which being hereinafter set forth.

Figure 1 represents a longitudinal section of a wheel and bearing embodying my invention. Fig. 2 represents an elevation of a portion of the device, showing the balls. Fig. 3 represents an elevation of a plate employed in detached position.

Similar letters of reference indicate corresponding parts in the figures.

Referring to the drawings, A designates an axletree or bearing, which is hollow, as at B, and receives the spindle or journal C, the forward portion $C^2$ of which is squared or angular and is fitted in a correspondingly-shaped opening in the hub E of the wheel, to which are secured the spokes F, it being seen that said wheel rotates as one with said spindle and that the wheel is boxless.

In order to retain the wheel on the polygonal portion $C^2$, I employ a nut G, which is fitted on the threaded stem H on the outer end of the polygonal portion $C^2$.

Fitting within the opening B in the axletree A and around the spindle C is a sleeve J, which is screwed or otherwise secured to the block K, which is screwed or otherwise secured to the axletree A, said block having a bearing or run for the balls L, the other a bearing or run for said balls being in the plate or disk M, which is rigidly secured to the hub E of the wheel in the present instance by engagement with the ring U, which is rigidly secured to the hub E, said ring U entering recesses V in the plate M, it being seen that the end portion of the axle, the balls and bearing therefor are in a recess in the hub E, provided therefor.

N designates a block secured to the sleeve J and in which is a bearing or run for the balls P, the other bearing being in the nut Q, which is screwed or otherwise secured to the inner end of the spindle C.

Any suitable means may be employed for lubricating the parts. For example, suitable ducts may be made in the axletree, it being seen that a suitable space or passage is formed between the spindle C and the sleeve J and that a space or passage S is formed between the hub E and the axletree A, while a space or passage T is formed between the nut Q and the axletree A, the effect of all of which is evident. In this manner the spindle C rotates with reduced friction, and consequently more easily, and the bearings thereof are the balls L and P. The forward portion of the axletree being within the hub, the weight is over the adjacent portion of the axletree, and the far end of the spindle will not tilt when the vehicle is on a level.

It will be noticed that the ring U, which is between the plate M and the hub E, takes part of the weight from the polygonal portion of the hub.

W designates a ring which is adapted to prevent the plate M from rotating on the spindle after said plate is in proper position thereon, said ring W being provided with a lug or tongue A', which is adapted to enter a recess B' in the polygonal portion of the spindle, whereby the ring cannot rotate with respect to said spindle.

D is a plate or washer on the threaded stem H and against which the nut G bears, as seen in Fig. 1.

C' designates a pin on the ring W, which is adapted to enter one of the openings D', formed in the plate M, whereby the plate is locked with respect to the said spindle.

It will be evident that various changes may be made in the details of construction which will come within the scope of my invention, and I do not, therefore, desire to be limited in each instance to the exact construction herein shown and described.

Having thus described my invention, what I claim as new, and desire to secure by Letters Patent, is—

1. A wheel-hub having a chamber, a chambered axletree having its outer end located within the chamber of the hub, a spindle, a ball-bearing for the inner end of the spindle within the chamber of the axletree, a ball-bearing within the chamber of the hub, means securing the outer end of the spindle to the hub to rotate therewith, and means located within the chamber of the hub for engaging the adjacent ball-bearing to lock it with respect to the spindle.

2. A chambered wheel-hub, a chambered axletree, a spindle, a ball-bearing for the inner end thereof within the chamber of the axletree, a ball-bearing within the chamber of the hub and a ring located within a recess within the chamber of the hub and engaging the adjacent ball-bearing and having means connecting it with the spindle.

3. A chambered wheel-hub, a ring rigidly secured within the same, a plate having recesses engaged by portions on said ring, a spindle having a polygonal portion engaging a corresponding opening in said plate, means securing the outer end of the spindle to the hub, a ball-bearing for the inner end of the spindle, a chambered axletree, a block secured within the same and a sleeve secured to said block and to the bearing of the inner end of the spindle.

4. A chambered wheel-hub, a plate within said chamber and movable with the hub and having openings, a ring seated in a recess in the chambered hub and having a pin engaging one of said openings in the plate, a ring surrounding said plate and interposed between the same and the inner wall of the chamber of said hub, a spindle, a hollow axletree surrounding the same, a sleeve within the axletree, a block secured to said sleeve for coöperation with said plate to form a raceway for balls, ball-bearings at the inner end of the chamber of the axletree, and means on the outer end of the spindle bearing against the outer face of the hub.

5. A chambered hub, a plate therein, a ring around said plate, a ring seated within the recess in the chamber of the hub and having means for engagement with said plate, a spindle having threaded portion upon which said plate is screwed and having a polygonal portion fitting a correspondingly-shaped opening in said last-mentioned ring and in the outer face of the hub, said spindle being formed with a recess in its polygonal portion to receive a tongue on the adjacent portion of the ring, ball-bearings for the inner and outer ends of the said spindle, the said plate having peripheral recesses receiving portions of the ring surrounding the plate, and means for securing the outer end of the spindle in position.

WILLIAM L. MARTIN.

Witnesses:
WM. VANDEVEER,
SPENCER HAINES.